United States Patent
Müller et al.

(10) Patent No.: US 10,752,546 B2
(45) Date of Patent: Aug. 25, 2020

(54) ADJUVANT COMBINATION OF A MILLING ASSISTANT AND A CONCRETE ADMIXTURE FOR ACCELERATED HYDRATION OF CEMENTITIOUS BINDERS

(71) Applicant: SIKA TECHNOLOGY AG, Baar (CH)

(72) Inventors: Thomas Müller, Heidelberg (DE); Christian Bürge, Schafisheim (CH); Beat Marazzani, Oberengstringen (CH); Christophe Kurz, Endingen (CH)

(73) Assignee: SIKA TECHNOLOGY AG, Baar (CH)

( * ) Notice: Subject to any disclaimer, the term of this patent is extended or adjusted under 35 U.S.C. 154(b) by 312 days.

(21) Appl. No.: 14/904,458

(22) PCT Filed: Jul. 9, 2014

(86) PCT No.: PCT/EP2014/064735
§ 371 (c)(1),
(2) Date: Jan. 12, 2016

(87) PCT Pub. No.: WO2015/004196
PCT Pub. Date: Jan. 15, 2015

(65) Prior Publication Data
US 2016/0176758 A1    Jun. 23, 2016

(30) Foreign Application Priority Data

Jul. 12, 2013   (EP) .................................... 13176377

(51) Int. Cl.
C04B 24/12 (2006.01)
C04B 28/04 (2006.01)
C04B 22/00 (2006.01)
C04B 28/02 (2006.01)

(52) U.S. Cl.
CPC ........ C04B 24/122 (2013.01); C04B 22/0086 (2013.01); C04B 28/02 (2013.01); C04B 28/04 (2013.01)

(58) Field of Classification Search
CPC ....... C04B 24/12; C04B 24/121; C04B 28/02; C04B 40/0028; C04B 24/122; C04B 22/0086; C04B 14/043; C04B 2103/10; C04B 2103/12; C04B 2103/52; C04B 22/06; C04B 22/085; C04B 22/12; C04B 22/14; C04B 24/02; C04B 24/2641; C04B 28/04

See application file for complete search history.

(56) References Cited

U.S. PATENT DOCUMENTS

| | | | | |
|---|---|---|---|---|
| 3,443,976 A | * | 5/1969 | Dodson | C04B 24/128 106/727 |
| 4,606,770 A | * | 8/1986 | Gerber | C04B 24/128 106/727 |
| 5,017,234 A | | 5/1991 | Gartner et al. | |
| 8,119,727 B2 | * | 2/2012 | Pakusch | C04B 24/2605 524/2 |
| 8,460,457 B2 | * | 6/2013 | Cheung | C04B 7/52 106/724 |
| 9,040,609 B2 | * | 5/2015 | Langlotz | C04B 28/02 524/5 |
| 2006/0272554 A1 | * | 12/2006 | Jardine | B02C 23/06 106/823 |
| 2011/0269875 A1 | * | 11/2011 | Nicoleau | C04B 28/02 524/2 |

FOREIGN PATENT DOCUMENTS

| | | |
|---|---|---|
| WO | 2010/026155 A1 | 3/2010 |
| WO | 2011/022217 A1 | 2/2011 |
| WO | 2012/025567 A1 | 3/2012 |
| WO | 2012/072466 A1 | 6/2012 |
| WO | 2013/083627 A1 | 6/2013 |

OTHER PUBLICATIONS

CN 105198275 A abstract Dec. 30, 2015 Yin et al. (Year: 2015).*
CN 201510713130 A abstract Oct. 28, 2015 Yun et al. (Year: 2015).*
KR 2008111645 A abstract Dec. 24, 2008 Cha et al. (Year: 2008).*
Oct. 31, 2014 Search Report issued in International Patent Application No. PCT/EP2014/064735.
Jan. 19, 2016 International Preliminary Report on Patentability issued in International Patent Application No. PCT/EP2014/064735.
Nov. 16, 2018 Office Action issued in European Patent Application No. 14739121.3.

\* cited by examiner

*Primary Examiner* — Shuangyi Abu Ali
(74) *Attorney, Agent, or Firm* — Oliff PLC

(57) ABSTRACT

An adjuvant combination composed of a milling assistant and a concrete admixture for a composition including cement, for accelerating cement hydration, wherein the milling assistant includes at least one amino alcohol and at least one cement hydration accelerator selected from chlorides, thiocyanates, nitrates, nitrites and hydroxides, and the concrete admixture includes a reaction product of at least one calcium compound with at least one silicon compound selected from a silicon dioxide compound, a silica compound and a silicate compound. Using the adjuvant combination produces a significant acceleration in the hardening of a composition including cement, after the addition of water. This is an advantage especially in the production of prefabricated concrete components, allowing quicker deshuttering.

12 Claims, No Drawings

ADJUVANT COMBINATION OF A MILLING ASSISTANT AND A CONCRETE ADMIXTURE FOR ACCELERATED HYDRATION OF CEMENTITIOUS BINDERS

TECHNICAL FIELD

The invention relates to an admixture combination for cement-comprising compositions for accelerating cement hydration, to a method for producing a component from the cement-comprising composition using the admixture combination, and to the use of the admixture combination for cement-comprising compositions as hardening accelerator.

PRIOR ART

Compositions based on inorganic hydraulic binders such as cement, as for example concrete or mortar, have already long been used in order to produce components. For this purpose the composition comprising the hydraulic binder is mixed with water, and there is a chemical reaction of the hydraulic binder with water, referred to as hydration. As a result of the hydration, the composition solidifies and cures to form a solid shaped body.

Depending on application, different requirements are imposed on the profile of properties of the cement-comprising compositions in relation to the solidification and hardening process and the properties of the completed product.

In precast concrete or reinforced concrete components, or in trafficway or runway renewals, there are increasing demands, for example, for high early strength, so that after just a few hours the precast components can be deshuttered, transported, stacked, or prestressed, or the trafficways or runways traveled on. In order to achieve this objective in practice, use is made not only of high-performance concrete formulations, such as low w/c or high cement content, but also, often, of heat or steam treatments. These treatments use a lot of energy and so, for reason of increasing energy prices, considerable capital costs, and problems with durability and with exposed concrete, are increasingly being shunned, with alternative routes sought for accelerating the hardening process.

For operators of precast concrete works in particular, the rapid solidification of the fresh concrete in a component mold used as shuttering is extremely important, in order to permit rapid deshuttering of the concrete components. Deshuttering is the rate-determining step in these works, since there are only a limited number of component molds available.

While there are admixtures which bring about acceleration of solidification and hardening of the fresh concrete, there is nevertheless still a need for improvement here, in order to shorten the timespan before the deshuttering of the concrete components.

WO 2012/072466 A1 relates to a solid composition comprising a calcium silicate hydrate and a water-swellable polymer which can be used as a grinding aid for producing cement. Other grinding aids may additionally be used, a purpose for which, for example, mono- and polyglycols, polyalcohols, amino alcohols, organic acids and salts thereof, amino acids, sugars and residues from sugar production, inorganic salts, and organic polymers are recited.

WO 2013/083627 A1 relates to a hardening accelerator for mineral binders, comprising a reaction product of a calcium compound and a silicon compound, and an acid. The hardening accelerator may comprise further hardening-accelerating substances such as amino alcohols, hydroxycarboxylic acids, alkali and alkaline earth thiocyanates, alkali and alkaline earth halides, glycerol or glycerol derivatives.

WO 2012/025567 A1 describes a hardening accelerator for hydraulic binders, comprising a reaction product of a calcium compound and a silicon compound. The hardening accelerator may comprise additional additives such as further accelerator substances, acids or salts thereof, amine-containing substances, retardants, shrinkage reducers, defoamers, or foam formers.

WO 2011/022217 A1 describes an additive composition which comprises a specific air entrainer and a specific air pore reducer, and which can be added to cement clinker. Other, conventional cement additives may be added to the cement clinker.

U.S. Pat. No. 5,017,234 A relates to a cement which comprises a mixture of a clinker and a trialkanolamine having at least one C3-C5 hydroxyalkyl group. Other additives may be added to the cement.

PRESENTATION OF THE INVENTION

The object of the present invention was therefore that of providing an addition to cement-comprising compositions which permit accelerated cement hydration and hence more rapid solidification and hardening of the cement-comprising compositions, and therefore more rapid deshuttering of the components formed.

Surprisingly it has been found that this object can be achieved through a combination of two specific admixtures, namely a grinding aid and a concrete admixture, which are added in a suitable way to the composition comprising cement.

The present invention relates accordingly to an admixture combination of a grinding aid and a concrete admixture for a composition comprising cement for accelerating cement hydration, where the grinding aid comprises at least one amino alcohol and at least one cement hydration accelerator selected from chlorides, thiocyanates, nitrates, nitrites, and hydroxides, and the concrete admixture comprises a reaction product of at least one calcium compound with at least one silicon compound selected from a silicon dioxide compound, a silicic acid compound, and a silicate compound.

The use of a combination of the grinding aid and the concrete admixture achieves sharply accelerated hydration of cementitious binders. Where a composition comprising cement is admixed with the grinding aid and the concrete admixture, for example by processing cement which has been ground with the grinding aid into concrete, and the concrete admixture is added, there is, surprisingly, an additional acceleration in hydration, one which cannot be explained by additive effects of the individual components.

Enabled accordingly is a much quicker solidification and hardening of the fresh concrete, and so, in the production of precast concrete components, for example, the timespan up to the deshuttering of the components can be shortened significantly. The molds for the components are more quickly reavailable when the stated products are used, and the operator is able to achieve an overall increase in production of the concrete components.

A further advantage is increased cement production if the clinker is ground to cement in the presence of the grinding aid.

A particularly surprising additional advantage, furthermore, is that the stated combination of grinding aid and concrete admixture results in an increased compressive strength in comparison to the use of the individual components.

The invention is elucidated in detail below.

Way of Performing the Invention

The admixture combination of the invention constitutes a grinding aid and a concrete admixture. The grinding aid comprises at least one amino alcohol and at least one cement hydration accelerator selected from chlorides, thiocyanates, nitrates, nitrites, and hydroxides.

One or more amino alcohols may be used. Amino alcohols have at least one amine group and at least one hydroxyl group. The amino alcohol is preferably an amine, as for example a monoamine, a diamine, or a polyamine having more than two amino groups, and has at least one alkanol group, preferably 1 to 4 alkanol groups, bonded to at least one N atom. The alkanol group includes at least one hydroxyl group, preferably 1 to 3, more preferably 1 hydroxyl group. This is preferably a $C_1$-$C_4$ alkanol group, as for example a methanol, ethanol, isopropanol, or n-propanol group. The amino alcohol may optionally have one or more further substituents on the amino group, as for example a $C_1$-$C_4$ alkyl group, such as a methyl, ethyl, isopropyl, or n-propyl group.

Examples of suitable amino alcohols are monoethanolamine (MEA), diethanolamine (DEA), triethanolamine (TEA), diethanolisopropanolamine, ethanoldiisopropanolamine, isopropanolamine, diisopropanolamine (DiPA), triisopropanolamine (TiPA), N-methyldiisopropanolamine (MDiPA), N-methyldiethanolamine (MDEA), N-ethyldiethanolamine (EDEA), N,N,N',N'-tetrakis(hydroxyethyl)ethylenediamine (THEED), 2-(diisopropylamino)ethanol, 2-(2-aminoethylamino)ethanol, N,N'-bis(2-hydroxyethyl)ethylenediamine, 2-amino-2-methyl-1,3-propanediol (AMPD), tris(hydroxymethyl)aminomethane (TRIS), 3-amino-1,2-propanediol (APD), 2-(2-aminoethoxy)ethanol, and N,N,N',N'-tetrakis(2-hydroxypropyl)ethylenediamine (THPED).

Amino alcohols employed with particular preference are triethanolamine, diisopropanolamine, triisopropanolamine, diethanolisopropanolamine, N-methyldiisopropanolamine, and N-methyldiethanolamine.

The grinding aid further comprises one or more cement hydration accelerators selected from chlorides, thiocyanates, nitrates, nitrites, and hydroxides. The cement hydration accelerator is preferably a metal salt, preferably an alkali or alkaline earth salt, of chlorides, thiocyanates, nitrates, nitrites, or hydroxides.

The at least one cement hydration accelerator is preferably an alkali or alkaline earth chloride, alkali or alkaline earth thiocyanate, alkali or alkaline earth nitrate, alkali or alkaline earth nitrite, or alkali or alkaline earth hydroxide. The alkali metal or alkaline earth metal for these salts is preferably Li, Na, K, Mg, and Ca.

Specific examples of suitable cement hydration accelerators are calcium chloride, sodium chloride, calcium thiocyanate, sodium thiocyanate, sodium hydroxide, calcium nitrate, sodium nitrate, calcium nitrite, sodium nitrite, and combinations of two or more of these compounds.

In one preferred embodiment the at least one cement hydration accelerator is selected from a chloride, more particularly an alkali or alkaline earth chloride, a thiocyanate, more particularly an alkali or alkaline earth thiocyanate, or a combination of a chloride, more particularly an alkali or alkaline earth chloride, and a thiocyanate, more particularly an alkali or alkaline earth thiocyanate, the stated combination being particularly preferred.

In one optional and preferred embodiment the grinding aid further comprises one or more glycols. Suitable glycols here are, in particular, alkylene glycols, examples being ethylene glycols and propylene glycols, more particularly glycols of the formula OH—(CH$_2$—CH$_2$O)$_n$—CH$_2$CH$_2$—OH with n=0-20, more particularly 0, 1, 2 or 3. Particularly preferred glycols are mono-, di- and polyglycols of ethylene and propylene. Especially preferred are diglycols, such as diethylene glycol and dipropylene glycol.

Examples of suitable glycols are monoethylene glycol, diethylene glycol, triethylene glycol, tetraethylene glycol, pentaethylene glycol, polyethylene glycol, in particular having 6 or more ethylene units, e.g., PEG 200, neopentyl glycol, hexylene glycol, propylene glycol, dipropylene glycol, tripropylene glycol, polypropylene glycol, and reaction products of ethylene oxide and propylene oxide, particular preference being given to diethylene glycol, propylene glycol, and dipropylene glycol.

The grinding aid comprises preferably 10 to 40 wt % of the at least one cement hydration accelerator selected from chlorides, thiocyanates, nitrates, nitrites, and hydroxides, preferably alkali or alkaline earth chlorides and/or alkali or alkaline earth thiocyanates, 2 to 40 wt % of at least one amino alcohol, preferably triethanolamine, and, if used, 2 to 25 wt % of at least one glycol, preferably diethylene glycol.

In one particularly preferred embodiment the grinding aid comprises 5 to 25 wt % of one or more alkali and/or alkaline earth chlorides, 5 to 25 wt % of one or more alkali and/or alkaline earth thiocyanates, 2 to 30 wt % of one or more amino alcohols, preferably triethanolamine, and, if used, 2 to 25 wt % of one or more glycols, preferably diethylene glycol.

The grinding aid may optionally comprise one or more further customary additives. Examples are carboxylic acids, defoamers, and polymer compounds such as polycarboxylate ethers and lignosulfonates.

The grinding aid may be present in liquid form, such as a solution or dispersion, for example. The grinding aid is preferably an aqueous solution or an aqueous dispersion. Alternatively the grinding aid can be used in solid form, as a powder, for example, or applied on a solid carrier material.

The second component of the admixture combination is a concrete admixture, which comprises a reaction product of at least one calcium compound with at least one silicon compound selected from a silicon dioxide compound, a silicic acid compound, and a silicate compound.

The at least one calcium compound preferably comprises calcium salts with inorganic or organic anions. Typical examples of the calcium compound are calcium chloride, calcium nitrate, calcium formate, calcium acetate, calcium bicarbonate, calcium bromide, calcium citrate, calcium chlorate, calcium hydroxide, calcium oxide, calcium hypochlorite, calcium iodate, calcium iodide, calcium lactate, calcium nitrite, calcium phosphate, calcium propionate, calcium sulfate, calcium sulfate hemihydrate, calcium sulfate dihydrate, calcium sulfide, calcium tartrate, calcium gluconate, calcium sulfamate, calcium maleate, calcium fumarate, calcium adipate, and calcium aluminate. The calcium compound is preferably selected from the group consisting of calcium nitrate and calcium sulfamate.

If the calcium compound used is calcium nitrate, the result is a particularly high compressive strength in hydraulic binders. If calcium sulfamate is the calcium compound used, this is advantageous in particular for a high level of slump in hydraulic binders.

The at least one calcium compound is reacted with at least one silicon compound selected from a silicon dioxide compound, a silicic acid compound, and a silicate compound to give a reaction product. Examples of the silicon compound are silica sand, silicas, e.g., silica sol, fumed silica, and precipitated silica, waterglass, such as sodium silicates and alkali silicates, and aqueous solutions thereof. The at least one silicon compound is preferably a silica sol, waterglass, fumed silica, or precipitated silica.

Silica sols, as they are called, are generally aqueous colloidal solutions of polysilicic-acid colloids. The $SiO_2$ content of typical silica sols may be 30 to 60 wt %. Depending on the size of the colloid particles, silica sol is milkily cloudy to colorlessly clear. The average particle diameter may be, for example, in the range from 1 to 150 nm, preferably from 1 to 50 nm, and more preferably from 1 to 15 nm.

More particularly the silica sol is a silica sol having an average particle diameter of 1-150 nm, more particularly of 1-50 nm, preferably 1.2-25 nm, especially 1.3-20 nm, very preferably 2-9 nm or 2.2-6 nm.

The average particle diameter can be determined by dynamic light scattering (DLS), especially by photon cross correlation spectroscopy (PCCS), preferably with a Nanophox instrument from Sympatec GmbH (Germany). The average particle diameter is understood presently as, in particular, the $d_{50}$.

Preparation is accomplished, for example, by treatment of aqueous alkali silicate solutions, also called waterglass, with ion exchangers and stabilization with a little alkali. Silica sols are available commercially, examples being the Levasils® from H. C. Stark or the Bindzils® from AkzoNobel.

The term "waterglass" refers to water-soluble salts of silicic acids that have solidified from the melt, more particularly potassium silicates and sodium silicates, or their aqueous solutions. They are described, for example, in CD Römpp Chemie Lexikon, Version 1.0, Georg Thieme Verlag, Stuttgart 1995. Examples are sodium silicates, sodium metasilicates, potassium silicates, potassium metasilicates, and mixtures thereof, and their aqueous solutions.

Fumed silicas are highly disperse silicas preparable by flame hydrolysis. In this procedure, silicon tetrachloride is decomposed in an oxyhydrogen flame. Precipitated silica is commonly prepared from aqueous alkali silicate solution, by precipitation with mineral acids. Formed in this procedure are colloidal primary particles, which agglomerate as reaction progresses, and ultimately fuse to form aggregates. Fumed silicas and precipitated silicas are likewise available commercially.

The reaction of the calcium compound with the silicon compound, particularly with a silica sol, takes place preferably in the presence of a solvent. Suitable solvents are, for example, water, alcohols and/or polyalcohols, more particularly glycol, glycerol, ethanol, or isopropanol. Water is the most-preferred solvent here.

A fraction of solvent, more particularly water, during the reaction amounts preferably to 25-95 wt %, more particularly 30-60 wt %, more particularly 35-50 wt %, based on the weight of the overall reaction mixture.

In particular, prior to the reaction, the calcium compound is initially introduced in the form of a solution comprising the calcium compound, more particularly an aqueous solution comprising the calcium compound. This solution comprising the calcium compound comprises the calcium compound, a solvent, and, optionally, further substances. Water in particular is used as solvent. A concentration of the calcium compound in the calcium solution is situated advantageously in the range of 5-80 wt %, more particularly 30-70 wt %, more preferably 40-60 wt %.

The calcium compound or calcium solution possesses in particular a pH of 2-10, preferably 3-9, more preferably 4-8, especially 5-7. The pH of the calcium compound or calcium solution especially is <7.

In particular, therefore, the reaction of the calcium compound CV with the silicon compound, more particularly the silica sol, takes place in the presence of water, more particularly in aqueous solution. The reaction comprises, in particular, a precipitation reaction between the calcium compound and the silicon compound, preferably the silica sol. The calcium compound is reacted with the silicon compound, preferably the silica sol, in particular to give a calcium silicate hydrate suspension.

The reaction of the calcium compound with the silicon compound takes place in particular at a pH of 2-12, more particularly 2-8, preferably 2.5-7, especially 3-6.5, more preferably 3-4.

With particular preference the reaction of the calcium compound with the silicon compound takes place under acidic conditions. Advantageous is a pH<7, especially <6, preferably <5 or <4.

If necessary, the pH may be brought to the desired value, more particularly a value as stated above, by an addition of an acid and/or base before and/or during the reaction of the calcium compound with the silicon compound.

According to one advantageous embodiment, before and/or during the reaction, the pH is adjusted by addition of an acid. The acid is more particularly an organic acid, preferably a carboxylic acid, more particularly a $C_1$-$C_4$ carboxylic acid, preferably acetic acid and/or formic acid. Formic acid is especially preferred.

The reaction of the calcium compound with the silicon compound takes place preferably essentially in the absence of a hydraulic binder and/or in the absence of a cementitious binder and/or in the absence of cement. This means in particular that the fraction of such materials during the reaction is <10 wt %, preferably <5 wt %, especially <1 wt %, more preferably <0.5 wt % or <0.1 wt %. Especially there are no such materials at all present during the reaction. The reaction product, in particular, is not cement clinker or cement.

Any mixing with such materials does not take place, in particular, until the use of the setting and hardening accelerator produced, such use taking place, in particular, with a time delay and/or physical separation from the production of the setting and hardening accelerator.

If silica sol is the silicon compound used, it preferably has a pH of 3-12, more particularly of 7-12, very preferably of 10-11. This is of advantage in that in hydraulic binders it results not only in a high compressive strength, more particularly a high compressive strength after 8 hours, but also in a high level of slump, in particular a high level of slump after 1 minute, in conjunction with high stability of the accelerator.

If the silica sol has a pH of 7-9, this is conductive to the attainment of particularly high compressive strength in hydraulic binders.

If the silica sol has a pH of 3-5, this is conductive to the attainment of an advantageous slump in hydraulic binders.

If a silica sol is used that has a pH in the range of 7-12, more preferably of 10-11, particularly advantageous compressive strengths and processing properties on the part of hydraulic compositions are the result. At the same time, the accelerator is particularly stable.

The silica sol is preferably an aqueous solution or suspension having an $SiO_2$ content in the range from 3-30 wt %, more particularly 4-20 wt %, especially preferably 10-18 wt %.

If a silicon compound other than silica sol is used, it is preferably likewise used as an aqueous solution, aqueous colloid, or aqueous dispersion, with the pH being preferably greater than 8. Where necessary a base can be added in order to adjust the pH.

The ratio of the at least one calcium compound to the at least one silicon compound, according to a first embodiment, is selected preferably such that the molar ratio of silicon to calcium is in the range from 0.1 to 2.5, more preferably from 0.15 to 2.3, in order to form the reaction product. These ranges are especially advantageous when using a silica sol having a pH of 3-9, especially a pH of 3-5 or 7-9.

Where the calcium compound is calcium nitrate, in the case of the first embodiment, the molar ratio of silicon to calcium during the reaction is, for example, from 0.1 to 2.5, preferably from 0.15 to 0.6, more preferably from 0.2 to 0.4. This is especially advantageous for achieving an advantageous slump in hydraulic binders in conjunction with a high compressive strength after 8 hours.

Where the calcium compound is calcium sulfamate, in the first embodiment, the molar ratio of silicon to calcium during the reaction is preferably 0.1 to 2.5. The molar ratio is more preferably from 1.5 to 2.5, more particularly 2.0 to 2.5, in order to achieve a high compressive strength after 8 hours. The molar ratio, however, is preferably from 0.1 to 1.5, more particularly from 0.1 to 0.5, in order to achieve an advantageous slump in hydraulic binders.

According to a second advantageous embodiment, the Si:Ca molar ratio in the course of the reaction is less than 0.1, more particularly in the range of 0.005-0.095. With particular preference the Si:Ca molar ratio is in the range of 0.01-0.08, preferably 0.03-0.06. Such ratios are especially advantageous when using a silica sol having a pH in the range of 7-12, more preferably of 10-11.

The reaction of the calcium compound and of the silicon compound is accomplished preferably with stirring, more particularly with stirring under high shearing force, in order to supply mechanical energy to the reaction mixture. The reaction to form the reaction product takes place preferably in a liquid-phase reactor selected from the group consisting of Sulzer mixer-reactor, reactor with external recirculation, cascade reactor, loop reactor, stirred reactor, and reactor with rotor-stator mixer. Preferred liquid-phase reactors in particular are stirred reactors, static mixers, and reactors with rotor-stator mixer.

The reaction is carried out typically at a temperature of –10-90° C., e.g., at room temperature. The reaction, with further preference, is carried out under a pressure of 0.8 to 20 bar, e.g., at atmospheric pressure.

It is advantageous, after the reaction of the calcium compound and the silicon compound, for the reaction product to be comminuted. The comminution may be accomplished, for example, in agitator mills, roll mills, colloid mills, rotor-stator mixers and/or homogenizers, preferably by means of rotor-stator mixers and/or homogenizers. Of course, the reaction and comminution of the reaction product may be carried out in the same apparatus in one operation. Comminution is advantageous especially for an improved early strength of the compositions treated with the concrete auxiliary.

The reaction product is preferably in particle form, more particularly in the form of a dispersion or colloidal solution, such colloidal solutions or dispersions being preferably aqueous. The average particle size of the reaction product is situated, for example, in the range from 1000 to 10 nm, preferably from 100 to 10 nm. The average particle size pertains here to the volume average ($d_{50}$). The volume average can be determined, for example, by laser-optical means with dynamic laser light scattering.

The reaction product of the at least one calcium compound and the at least one silicon compound may be a calcium silicate or a calcium silicate hydrate, present preferably in the form of an aqueous dispersion.

The concrete admixture may comprise one or more further additives. The additives may be added, independently of one another, before, during, or after the reaction of the at least one calcium compound and the at least one silicon compound.

As an additive, furthermore, the concrete admixture may comprise, for example, at least one comb polymer. Comb polymers contain relatively long side chains at more or less regular intervals on a linear main chain. Comb polymers are known to the person skilled in the art. They are widely employed plasticizers for hydraulic binders such as cement. The comb polymer in question is preferably a water-soluble comb polymer. The comb polymer is preferably added before or during the reaction of the at least one calcium compound and the at least one silicon compound.

The comb polymer is preferably a polycarboxylate ether (PCE). The "spine" of the comb is in this case formed from a polycarboxylic acid (polycarboxylate), and the "teeth" (side chains) of the comb from polyether chains.

A compound selected from the group consisting of aluminum salt, aluminum hydroxide, aluminum oxide, magnesium salt, magnesium hydroxide, and magnesium oxide may further be added as an additive to the concrete admixture; these salts are selected more particularly from the group consisting of nitrates and nitrites. This additive is added preferably before or during the reaction of the at least one calcium compound and the at least one silicon compound.

It may further be advantageous to add N-methyldiethanolamine to the concrete admixture, in an amount, for example, of 1 to 10 wt %, preferably of 2 to 8 wt %, and more preferably of 4 to 8 wt %, based on the total weight of the concrete admixture. Surprisingly it has been found that this has advantageous consequences for the compressive strength after 8 hours. It has also been surprisingly found that the N-methyldiethanolamine improves the storage stability of the concrete admixture.

The concrete admixture may also comprise a thickener. Examples of suitable thickeners are cellulose ethers, polysaccharides, starch derivatives, polyvinyl alcohols, polyacrylamides, and polyacrylates, with polyacrylates being preferred. The concrete admixture may also include a dispersant, though this is not necessary. Examples of suitable dispersants are polycarboxylates, sulfonated melamine-formaldehyde condensates, sulfonated naphthalene-formaldehyde condensates, lignosulfonates, and polyoxyalkylenes.

N-Methyldiethanolamine, thickeners and/or dispersants, if used, are added preferably after the reaction of the at least one calcium compound and the at least one silicon compound.

The concrete admixture is preferably in liquid form, for example, as a solution, sol, or dispersion, in water, in an organic solvent as defined above, or in a mixture of water and organic solvent. With particular preference the concrete admixture takes the form of an aqueous solution, aqueous sol, or aqueous dispersion.

The concrete admixture may alternatively be present in solid form, as—for example—powder, flakes, pellets, granules, or plates. In solid form it can be readily transported and stored.

The admixture combination is used for a composition comprising cement. Cement is an inorganic binder with a hydraulic action. For the preparation of cement, clinker, or cement clinker, is finely ground either alone or with further principal constituents and/or up to 5 wt % of secondary constituents. To regulate solidification, furthermore, calcium sulfate (gypsum and/or anhydrite) is added.

The cement preferably comprises a fraction of at least 5 wt %, more particularly at least 20 wt %, preferably at least 35 wt %, very preferably at least 65 wt %, of cement clinker. The cement clinker is preferably a Portland cement clinker. Within the cement, the cement clinker is present in the form of ground cement clinker.

As further principal constituents and/or secondary constituents for the production of the cement, latent hydraulic binders, pozzolanic binders and/or inert materials may be added. Examples are slag sand or slag, pozzolans, flyash, burnt shales, limestones, and silica dust. Besides ground cement clinker and calcium sulfate, accordingly, cement may comprise one or more further mineral binders and also inert materials, which must be taken into account for the cement weight.

Cements are classified according to composition. For this purpose there exist a variety of standards, some of them specific to particular countries, an example being DIN EN 197-1, in which the cements are classified with regard to the fraction of cement clinker and, if present, the nature and amount of further principal constituents.

The admixture combination according to the invention is suitable for all cement types, especially for cement of type CEM I, CEM II, CEM III/A and/or CEM III/B according to the EN 197-1 standard. A particularly suitable cement is a cement of type CEM II/A or CEM II/B. Also suitable, naturally, are corresponding types of cement classified in relation to a different standard.

The composition as well as the cement may comprise customary admixtures. Examples are concrete plasticizers, corrosion inhibitors, superplasticizers, shrinkage reducers, defoamers, or air entrainers. The composition may additionally comprise customary additives, examples being inert or largely inert additives, such as finely ground rock, e.g., finely ground quartz or limestone, and pigments, pozzolanic or latent hydraulic additives, such as flyash, slag sands, silica dust, trass, or synthetic pozzolans, and fiberlike additives. Furthermore, the composition may comprise customary aggregates such as sand, gravel and/or stones.

The composition comprising cement is preferably a concrete or mortar.

The admixture combination constitutes two separate components, these being first the grinding aid and secondly the concrete admixture. The separate components are added preferably at different points in time to the composition comprising cement or to a precursor thereof. Through the addition of the combination of grinding aid and concrete admixture, the addition of water to the composition comprising cement produces a surprisingly quick cement hydration and hence a strong acceleration of solidifying or hardening.

The grinding aid is added preferably to the clinker, in order for the clinker to be ground in the presence of the grinding aid to form cement. The grinding aid, for example, may simply be mixed with the clinker, or sprayed in liquid form on to the clinker. In another possible embodiment, the grinding aid is mixed with the cement that has already been ground.

The concrete admixture is added to the composition comprising cement and the grinding aid preferably at the same time as, or shortly before, or shortly after, the addition of the tempering water. Having proven particularly suitable in this context is the addition of the concrete admixture in the form of an aqueous solution or dispersion, more particularly as tempering water or as part of the tempering water or as part of the liquid additive which is added with the tempering water to the composition comprising cement.

Alternatively the concrete admixture can be added in the solid aggregate state to a cement or to a composition comprising cement, and mixed with it. Obtained in that case are cement compositions, referred to as a dry mix, which are storable for a relatively long time and typically can be packed in sacks or stored in silos.

In another embodiment the concrete admixture can be sprayed in liquid form onto the ground cement or the composition comprising cement. The cement or the composition comprising cement can in this way be coated, for example, partly with the concrete admixture.

The two last-mentioned alternatives are made possible by the production of a cement or of a composition comprising cement that may already contain a combination of the grinding aid and the concrete admixture and so may be stored and sold as a finished mixture, in the form, for example, of rapid-setting cement. Following addition of the tempering water, this cement exhibits the desired properties of quick setting and of high early strength, without any need for a further additive to be added additionally to the tempering water on the building site.

The amount of grinding aid and concrete admixture which can be added to the composition comprising cement may vary within wide ranges. The grinding aid is metered, for example, in an amount such that the fraction of the grinding aid is in the range from 0.001 wt % to 1.0 wt %, preferably from 0.01 wt % to 0.5 wt %, and more preferably from 0.02 wt % to 0.3 wt %, based on the cement weight.

The concrete admixture is metered, for example, in an amount such that the fraction of the concrete admixture is in the range from 0.01 wt % to 30.0 wt %, preferably from 0.2 wt % to 6.0 wt %, and more preferably from 0.5 wt % to 4.0 wt %, based on the cement weight.

The invention accordingly also relates to a method for producing a component from a composition comprising cement with accelerated cement hydration, comprising a) grinding clinker to cement, and optionally adding admixtures, additives and/or aggregates to the cement in order to obtain a composition comprising cement, b) mixing the composition comprising cement with tempering water, in order to obtain a fresh mortar or fresh concrete, c) installing the fresh mortar or fresh concrete onto a substrate or into shuttering, and optionally compacting it, and d) solidifying and hardening the fresh mortar or fresh concrete, and optionally deshuttering, in order to obtain the component, where in one of the steps a) and/or b) the grinding aid and the concrete admixture as defined above are added independently of one another.

Suitable amounts of grinding aid and concrete admixture in relation to the composition comprising cement, and also suitable types and timings for the addition of grinding aid and concrete admixture to the composition comprising cement have already been elucidated above.

It is preferred for the grinding aid to be added to the clinker, in order for the clinker to be ground to the cement in the presence of the grinding aid, or for the grinding aid to be ground with the cement, in order for a modified cement to be obtained that can be used for the composition comprising the cement.

The concrete admixture is preferably added to the tempering water or used as tempering water, particularly if it is in liquid form. Alternatively the concrete admixture may be added separately before, during, or after the addition of the tempering water, to the composition comprising cement.

The component may be a floor or wall covering, a wall or any other component, of a built structure, for example. Of course, additional constituents may be installed into the component, an example being a steel reinforcement. The method is particularly suitable for the production of precast concrete units. A component mold is used preferably as the shuttering, and the component obtained after deshuttering is preferably a precast concrete unit.

The present invention provides a combination of grinding aid and concrete admixture which greatly accelerates the setting and hardening process of cement and compositions comprising it, without adverse effects on the working times, the development of strength, or the durability of the components produced therewith, more particularly mortar components or concrete components. The use of the combination according to the invention is therefore particularly suitable if the hydraulically setting composition a very short time after application is to be deshuttered or must be capable of load-bearing or of being traveled on, as for example in road construction or bridge construction, in the prefabrication of concrete elements in the context of precast concrete and reinforced concrete units, or in the context of runway renewals, particularly in the case of airstrips. Through use of the combination according to the invention, the precast parts can, after just a few hours, be deshuttered, transported, stacked, or prestressed, or the trafficways or runways traveled on.

The combination of the grinding aid and of the concrete admixture as defined above are therefore suitable for use in a composition comprising cement, as hardening accelerator for accelerating the cement hydration on addition of water.

EXAMPLES

The invention is elucidated further by examples below, which, however, are not intended to restrict the invention in any way. Unless otherwise specified, all amounts are given by weight.

Grinding Aid (MH)

A grinding aid MH is obtained by mixing the components listed in the table below, in the proportions indicated.

|  | Parts by weight |
|---|---|
| Water | 63.2 |
| Calcium chloride | 15.1 |
| Triethanolamine | 10.4 |
| Diethylene glycol | 6.80 |
| Acetic acid | 4.00 |
| Defoamer | 0.30 |
| Biocide* | 0.20 |

*Acticide ® from Thor GmbH

Concrete Admixture 1 (BZM1)

47.4 wt % of $Ca(NO_3)_2 \times 4\ H_2O$ (from Yara GmbH & Co., Germany), 6.0 wt % of methyl-diethanolamine were dissolved in 11.9 wt % of water and introduced into a 2 liter beaker. Thereafter 34.7 wt % of Cembinder® 110 (silica sol from AkzoNobel, Sweden: particle size 2.5 nm, pH 6, colloidally dissolved polysilicic acid molecules with 7.2% $SiO_2$ content) were added over the course of an hour. The contents of the 2 liter beaker were stirred using a paddle stirrer (RW 20.n, Ika Labortechnik) having a paddle stirrer diameter of 5 cm at 500 to 2000 rpm during the addition of Cembinder® 110 and also for a further 15 minutes. This was followed by 30 seconds of homogenization with a rotor-stator mixer (PT2100, Polytron, Kinematica, Switzerland). Mixing with the rotor-stator mixer was followed by a further 15 minutes of stirring with a paddle stirrer. The pH of Cembinder® 110 was 6.0.

In this way, an aqueous dispersion of a reaction product of the calcium compound and of the silica sol was prepared. The Si:Ca molar ratio in the initial components was 0.31. Each of the wt % figures is based on the total weight of the accelerator.

Concrete Admixture 2 (BZM2)

70.8 wt % of $Ca(NO_3)_2$ (50 wt % in $H_2O$, Yara GmbH & Co., Germany), 9.8 wt % of sodium thiosulfate, 6.4 wt % of methyldiethanolamine were dissolved in 4.8 wt % of water and introduced into a 2 liter beaker. Thereafter 4.9 wt % of silica sol (Cembinder® 2509, particle size 5 nm, pH 10.5, colloidally dissolved polysilicic acid molecules with 15.4 wt % $SiO_2$ content) were added over the course of 15 minutes and the pH was adjusted to a level of 3.8 using 3.3 wt % of formic acid. The fraction of water was approximately 44 wt % and the silicon:calcium ratio was 0.058. Each of the weight figures is based on the total weight of the accelerator. The contents of the 2 liter beaker were stirred using a paddle stirrer (RW 20.n, Ika Labortechnik) having a paddle stirrer diameter of 5 cm at 500 to 1000 revolutions per minute during the addition of the silica sol and also for a further 5 minutes.

The pH during the reaction was consistently in the range of 3.8-3.9.

BZM2 is a very finely divided calcium silicate hydrate-comprising suspension.

Mortar Mixture

The activity of the admixture combination was tested on a standard mortar according to EN 196-1 with the following composition:

| Portland cement (CEM I 42.5N) | 450 g |
|---|---|
| Standard sand 0-4 mm | 1350 g |
| Water | 225 g |

The cement used was a mixture consisting of equal parts by weight of the three Swiss cement grades CEM I 42.5N Holcim (Siggenthal), CEM I 42.5N Vigier, and CEM I 42.5N Jura Cement (Wildegg), which had a Blaine fineness of approximately 3400 $cm^2/g$.

Testing

Compressive strengths were ascertained for the aforementioned mortar mixture 8 h, 12 h, 24 h, and 48 h after addition of the tempering water. The test for determining the compressive strength (in MPa) took place by means of prisms (40×40×160 mm) according to EN 196-1.

Working

The mixing procedure was carried out in analogy to the EN 196 standard. The procedure was repeated a number of times, with addition of no additive or with addition of the grinding aid (MH) only, the concrete admixture (BZM1 or BZM2) only, or the admixture combination of MH and BZM1 or BZM2. The grinding aid, when used, was ground with the cement before the mixing of the components of the mortar mixture, and the cement thus modified was used for the mortar mixture. If the concrete admixture was used, it was dissolved or dispersed in the tempering water and added with the tempering water into the mortar mixture.

The amounts of grinding aid and/or of concrete admixture used are listed in tables below and expressed in wt % based on the cement weight.

Two variants were tested. In variant A, the water/cement (w/c) figure was 0.5 (in analogy to EN 196). In variant B, there was a departure from the standard composition of the mortar, and the water/cement (w/c) figure was 0.4. Additionally, in variant B, the mortars were admixed additionally with 1 wt % (based on the cement weight) of a plasticizer (Sika ViscoCrete® 1020X, available from Sika Deutschland GmbH), in order to improve the workability of the mortar mixtures.

Assembled in the tables below are the results (all percentages are wt % based on the cement weight):

Variant A

|  | 1 | 2 | 3 | 4 | 5 | 6 |
|---|---|---|---|---|---|---|
| MH | — | — | — | 0.3% | 0.3% | 0.3% |
| BZM1 | — | 4.0% | — | — | 4.0% | — |
| BZM2 | — | — | 4.0% | — | — | 4.0% |
| Compressive strength | [MPa] | [MPa] | [MPa] | [MPa] | [MPa] | [MPa] |
| 8 h | 1.4 | 3.1 | 3.8 | 3.2 | 5.2 | 6.2 |
| 12 h | 4.9 | 9.5 | 11.2 | 9.5 | 9.4 | 14.5 |
| 24 h | 19.7 | 19.2 | 25.0 | 23.4 | 21.4 | 27.0 |
| 48 h | 30.5 | 33.7 | 35.3 | 32.7 | 33.9 | 36.9 |

Variant B

|  | 1 | 2 | 3 | 4 | 5 | 6 |
|---|---|---|---|---|---|---|
| MH | — | — | — | 0.3% | 0.3% | 0.3% |
| BZM1 | — | 4.0% | — | — | 4.0% | — |
| BZM2 | — | — | 4.0% | — | — | 4.0% |
| Compressive strength | [MPa] | [MPa] | [MPa] | [MPa] | [MPa] | [MPa] |
| 8 h | 0.5 | 2.5 | 6.1 | 1.8 | 5.7 | 9.5 |
| 12 h | 3.5 | 13.1 | 20.4 | 12.4 | 14.2 | 24.7 |
| 24 h | 31.3 | 37.4 | 40.5 | 38.0 | 39.7 | 42.2 |
| 48 h | 53.1 | 59.2 | 53.8 | 53.3 | 57.4 | 55.0 |

When the admixture combination is used there is a significant improvement in the compressive strength, especially after 8 h, in comparison to the same components when used individually. This is a synergistic effect, which cannot be explained by additive effects of the individual components.

The invention claimed is:

1. An admixture combination of a grinding aid and a concrete admixture for a composition comprising cement for accelerating cement hydration, where
the grinding aid comprises 2 to 40 wt % of at least one amino alcohol, 10 to 40 wt % of at least one cement hydration accelerator selected from chlorides and thiocyanates, and 0 to 25 wt % of at least one glycol, based on the weight of the grinding aid,
the concrete admixture comprises a reaction product of at least one calcium compound with a silica sol,
the reaction of the calcium compound with the silica sol takes place in the presence of a solvent, in order to form the reaction product, and
the reaction product is not cement clinker or cement.

2. The admixture combination of claim 1, wherein the at least one amino alcohol is triethanolamine.

3. The admixture combination of claim 1, the grinding aid comprising a non-zero amount of the at least one glycol, the glycol being selected from diethylene glycol, propylene glycol, and dipropylene glycol.

4. The admixture combination of claim 1, the concrete admixture further comprising at least one comb polymer.

5. A combination of a grinding aid and a concrete admixture in a composition comprising cement as hardening accelerator for accelerating cement hydration on addition of water, where
the grinding aid comprises 2 to 40 wt % of at least one amino alcohol, 10 to 40 wt % of at least one cement hydration accelerator selected from chlorides and thiocyanates, and 0 to 25 wt % of at least one glycol, based on the weight of the grinding aid, the grinding aid optionally further comprising one or more cement additives selected from polymer compounds and defoamers;
the concrete admixture comprises a reaction product of at least one calcium compound with a silica sol;
the reaction of the calcium compound with the silica sol takes place in the presence of a solvent, in order to form the reaction product; and
the reaction product is not cement clinker or cement.

6. The combination in the composition of claim 5, wherein the at least one amino alcohol is triethanolamine.

7. The admixture combination of claim 1, wherein the grinding aid comprises 5 to 25 wt % of one or more alkali and/or alkaline earth chlorides, 5 to 25 wt % of one or more alkali and/or alkaline earth thiocyanates, and 2 to 30 wt % of the at least one amino alcohol, based on the weight of the grinding aid.

8. The admixture combination of claim 1, wherein the molar ratio of silicon to calcium in the reaction product is in the range of 0.005 to 0.4.

9. The admixture combination of claim 1, wherein the at least one calcium compound is selected from the group consisting of calcium chloride, calcium nitrate, calcium formate, calcium acetate, calcium bicarbonate, calcium bromide, calcium citrate, calcium chlorate, calcium hydroxide, calcium oxide, calcium hypochloride, calcium iodate, calcium iodide, calcium lactate, calcium nitrite, calcium phosphate, calcium propionate, calcium sulfate, calcium sulfate hemihydrate, calcium sulfate dihydrate, calcium sulfide, calcium tartrate, calcium gluconate, calcium sulfamate, calcium maleate, calcium fumarate, calcium adipate, and calcium aluminate.

10. The admixture combination of claim 9, wherein the at least one calcium compound is selected from the group consisting of calcium nitrate and calcium sulfamate.

11. The admixture combination of claim 1, wherein the average particle diameter of the silica sol is 1 to 150 nm.

12. The admixture combination of claim 1, wherein the solvent is water.

* * * * *